Patented June 10, 1930

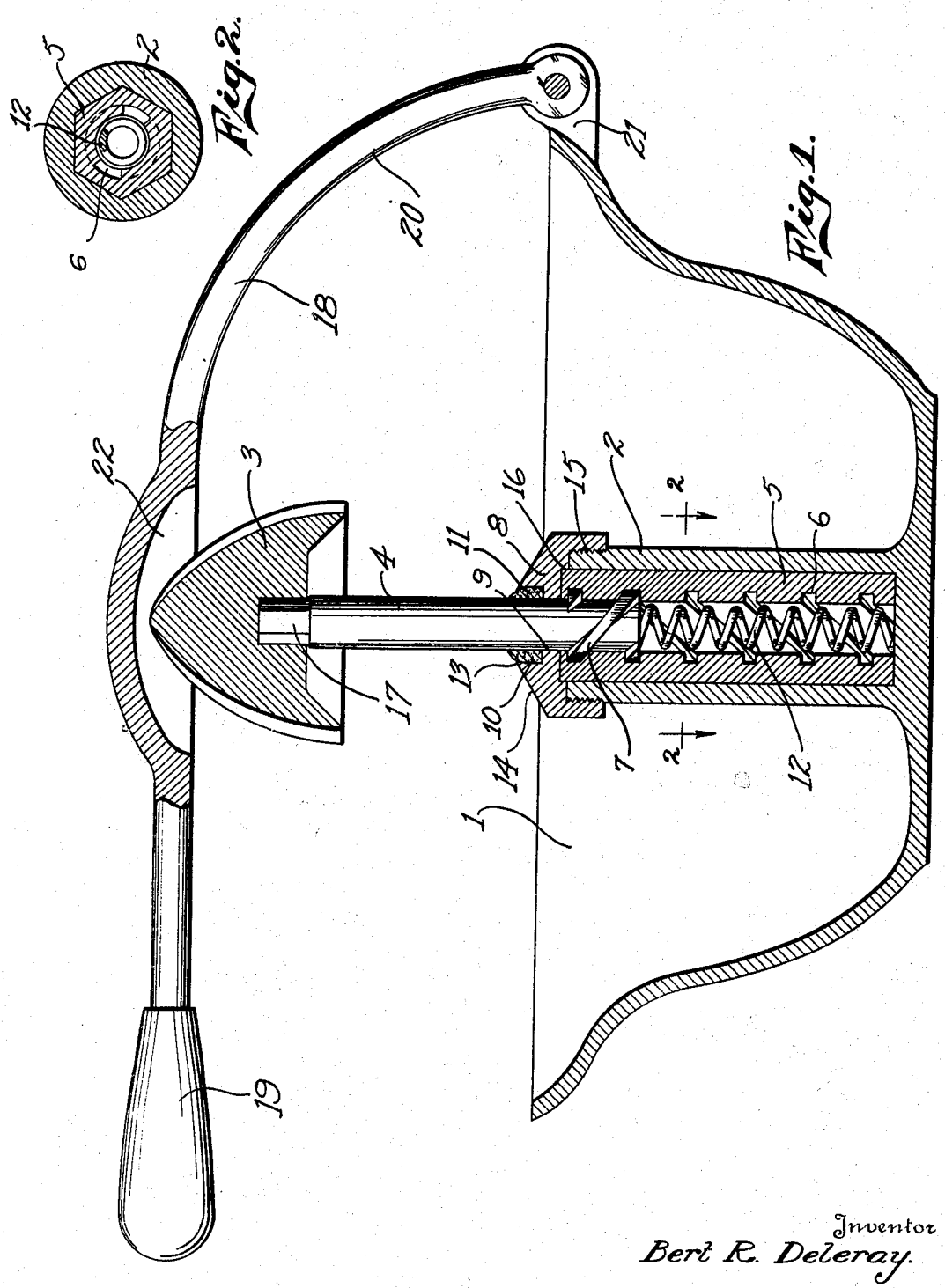

1,762,855

UNITED STATES PATENT OFFICE

BERT R. DELERAY, OF LOS ANGELES, CALIFORNIA

JUICE EXTRACTOR

Application filed April 7, 1928. Serial No. 268,127.

This invention relates to a juice extractor the purpose of which is to extract juice from citrus fruits.

Devices for this purpose have been employed involving the use of a rotatable burr mounted upon a stem guided to move downwardly, and in the operation of the device the half fruit is applied to the upper face of the burr and the burr and stem forced downwardly. In its downward movement a thread on the stem effects the rotation of the burr, thereby extracting the juice. In the devices referred to, there is no provision for excluding the juices from contact with the stem and this is objectionable because the stem and other working parts are of metal, corrosion of which is caused by the action of the acid in the extracted juices.

The general object of this invention is to provide a simple juice extractor to which the half fruit may be readily applied, and operated upon so as to extract the juices, and to provide simple means for housing the mechanism for guiding the stem and burr in their descent and for returning the same to an elevated position; also to provide means for excluding the juices from contact with the threads of the guide stem.

A further object of the invention is to improve the general construction of devices for this purpose, to provide simple means for collecting the juices and simple means for forcing the burr and stem downwardly without necessitating the operator of the device holding the fruit in his hand when the burr is being actuated to extract the juice.

Further objects of the invention will appear hereinafter.

The invention consists in the novel parts and combination of parts to be described hereinafter, all of which contribute to produce an efficient juice extractor.

A preferred embodiment of the invention is described in the following specification, while the broad scope of the invention is pointed out in the appended claims.

In the drawing:

Figure 1 is a vertical central section through a juice extractor embodying my invention, a portion of the depressing means for the burr and stem being shown in elevation.

Figure 2 is a cross-section taken about on the line 2—2 of Figure 1.

Referring more particularly to the parts, 1 represents a bowl which is provided preferably at its center with an integral upwardly extending sleeve 2. In using the device the inverted half fruit is applied to a rotary burr 3 having a guide stem 4 on its under side which extends downwardly and is guided within sleeve 2. The body of this stem is of plain cylindrical form. I provide means within the sleeve for effecting the rotation of the stem to rotate the burr as it is depressed. For this purpose I prefer to provide a bushing 5 within the sleeve having high-pitch threads 6 cut on its inner face. The lower end of the stem is provided with means for engaging the bushing to rotate the stem. For this purpose it is provided with high pitch-threads 7 to cooperate with the threads 6 to rotate the stem as it is forced downwardly. In order to retain the stem and exclude fruit juices from contact with the threads if such juices should splash upon the stem, I provide a cap 8 preferably in the form of a screw cap having an opening 9 through which the stem passes downwardly. This opening is preferably formed as a stuffing box 10 retaining a packing ring 11 of rubber, leather fiber or other suitable material. Suitable means is provided for effecting the return of the burr and stem after the same have been depressed. For this purpose I prefer to provide a coil spring 12 located within the bore of the bushing 5 and below the stem 4 so that this spring exerts an upward thrust upon the lower end of the stem. In order to retain the packing 11 I prefer to crimp inwardly the edge 13 that is formed around the packing 11. This edge will be an acute edge by reason of the fact that the upper face 14 of the cap is of conical form. The cap may be provided with screw threads 15 for securing it to the threaded upper end of the sleeve 2.

The upper end of the bushing 5 preferably extends into an annular recess 16 formed on the under side of the cap.

The sleeve 2 and bushing 5 are constructed in such a way that rotation of the bushing within the sleeve is prevented. Any suitable means may be employed for this purpose. In the present instance I effect this result by forming the interior of the sleeve of hexagonal form but any other angular form may be employed if desired.

The bowl and the sleeve may be formed of glass or similar material.

The burr 3 fits tight on an angular shank 17 formed on the upper end of the stem.

A juice extractor having the parts already described can be used for extracting fruit juices by holding the inverted fruit against the burr and forcing the same downwardly while the fruit is held in one's fingers. However, I prefer to provide means for pressing the fruit down which will avoid the necessity for holding it in one's fingers. For this purpose I prefer to provide a lever 18 having a handle 19 at its free end and having a curved inner end 20 which may be pivotally attached to the edge of the bowl between integral lugs 21 on the bowl. The body of this lever is substantially horizontal and is formed with a shallow socket 22 on its under side directly over the burr. By lifting the lever the fruit can be placed over the burr and the handle then pressed downwardly so as to press the fruit forcibly against the burr.

The force employed should be sufficient to cause the burr 3 and stem 4 to descend. As this descent occurs the spring 12 becomes compressed and when the downward pressure on the lever ceases, the spring 12 will operate to return the stem and burr to their normal elevated position. By repeating this movement once or twice the extractor will extract the juices from fruit.

It will be noted that by reason of the location of the sleeve at about the center of the bowl, the bowl operates effectively to catch the juices that run from the fruit. Furthermore the operating parts are housed in the sleeve and protected by the cap 8 from contact with the fruit juices.

It will be evident that my invention is capable of being used for performing light reaming operations, the article to be reamed being held in the socket 22 with its side to be reamed disposed below so as to come in contact with a reaming burr such as the burr 3.

What I claim is:

1. In a juice extractor, the combination of a bowl having a sleeve extending upwardly within the same, a burr having a plain cylindrical guide stem extending downwardly therefrom with its lower end housed within the sleeve, means on the sleeve and cooperating means on the lower end of the stem to cause a rotation of the stem when the burr and stem are forced downwardly, and means for returning the stem and burr to an elevated position after the same have been depressed.

2. In a juice extractor, the combination of a bowl having a sleeve extending upwardly within the same, a burr having a guide stem extending downwardly therefrom within the sleeve, means for connecting the sleeve and the stem to cause a rotation of the stem when the burr and stem are forced downwardly, and a spring within the sleeve operating to return the stem and burr to an elevated position after the same have been depressed.

3. In a juice extractor, the combination of a bowl having a sleeve extending upwardly within the same, a burr having a guide stem extending downwardly therefrom within the sleeve, means for connecting the sleeve and the stem to cause a rotation of the stem when the burr and stem are forced downwardly, and a coil spring disposed within the sleeve below the stem, thrusting against the lower end of the stem and operating to return the stem and the burr to an elevated position after the same have been depressed.

4. In a juice extractor, the combination of a bowl having a sleeve extending upwardly within the same, a burr having a plain cylindrical guide stem extending downwardly therefrom and through the upper end of the sleeve, means on the sleeve and cooperating means on the lower part of the stem to cause automatic rotation of the stem when the burr and stem are forced downwardly, means for returning the stem and burr to an elevated position after the same have been depressed, and movable means attached to the bowl for pressing the fruit down against the burr.

5. In a juice extractor, the combination of a bowl having a sleeve extending upwardly within the same, a rotatable burr having a plain cylindrical guide stem extending downwardly therefrom and through the upper end of the sleeve, means on the sleeve and cooperating means on the lower end of the stem to cause a rotation of the stem when the burr and stem are forced downwardly, means for returning the stem and burr to an elevated position after the same have been depressed, and a lever pivotally attached to the bowl to swing in a substantially vertical plane and extending across above the burr for forcing the fruit down on the burr.

6. In a juice extractor, the combination of a bowl having a sleeve extending upwardly within the same, a bushing within the sleeve having a high-pitch thread within the same, a burr having a guide stem extending downwardly through the bushing and having a high-pitch thread for engaging the thread of the bushing, a cap having an opening through which the stem passes and secured to the upper end of the sleeve, and a spring within the bushing thrusting against the lower end of the stem to return the burr and stem after the same have been depressed.

7. In combination, a stem having a plain cylindrical portion at its upper end, a guide sleeve for engaging the plain cylindrical portion to guide the stem to move up and down in a substantially vertical position, a burr carried by the upper end of the stem, a lever having a relatively fixed pivot at one side of the stem and having a handle for pressing an article with the lever down upon the burr so that the lever operates to depress the burr and the stem, and means on the lower end of the stem with cooperating means on the guide sleeve for automatically rotating the stem and burr while they are being depressed by the lever.

Signed at Los Angeles, California this 29 day of March, 1928.

BERT R. DELERAY.